United States Patent [19]

Tsujimoto

[11] Patent Number: 5,005,091
[45] Date of Patent: Apr. 2, 1991

[54] CASSETTE LOADING APPARATUS WITH SINGLE SWITCH CONTROL

[75] Inventor: Hisanaga Tsujimoto, Tokyo, Japan

[73] Assignee: Kabushiki Kaisha Toshiba, Kawasaki, Japan

[21] Appl. No.: 457,562

[22] Filed: Dec. 27, 1989

[30] Foreign Application Priority Data

Dec. 28, 1988 [JP] Japan .................................. 63-333616

[51] Int. Cl.⁵ ............................................. G11B 5/008
[52] U.S. Cl. ...................................... 360/96.5; 360/85; 360/95
[58] Field of Search ........................... 360/96.5, 85, 95; 242/197-200

[56] References Cited

U.S. PATENT DOCUMENTS

| | | | |
|---|---|---|---|
| 4,628,383 | 12/1986 | Miyamoto | 360/96.5 |
| 4,642,714 | 2/1987 | Miyamoto | 360/96.5 |
| 4,858,042 | 8/1989 | Ito | 360/96.5 |

*Primary Examiner*—A. J. Heinz
*Attorney, Agent, or Firm*—Cushman, Darby & Cushman

[57] ABSTRACT

A holder houses a cassette and is arranged to be movable in a horizontal state. A loading mechanism includes a guide for guiding the holder so as to load the cassette from a first position to a second position and to unload the cassette from the second position to the first position, and a driving member for driving the guide in load and unload states. A transmitting mechanism transmits a driving force from a driving source to the driving member. A switch includes a pair of contacts which are turned ON and OFF so as to selectively supply power to the driving source, and first and second actuators for turning ON and OFF the contacts. The second actuator engages with the guide at the second position assumed by the guide so as to turn OFF the contacts. A switching member includes first and second portions which can be freely engaged with the driving member and the first actuator. Engagement of the first portion with the driving member releases at the first position assumed by the guide so as to cause the second portion to be engaged with the first actuator, thereby turning ON the contacts. The first engaging portion engages with the driving member at the first position assumed by the guide so as to cause the second portion to be disengaged from the first actuator, thereby turning ON the contacts.

7 Claims, 16 Drawing Sheets

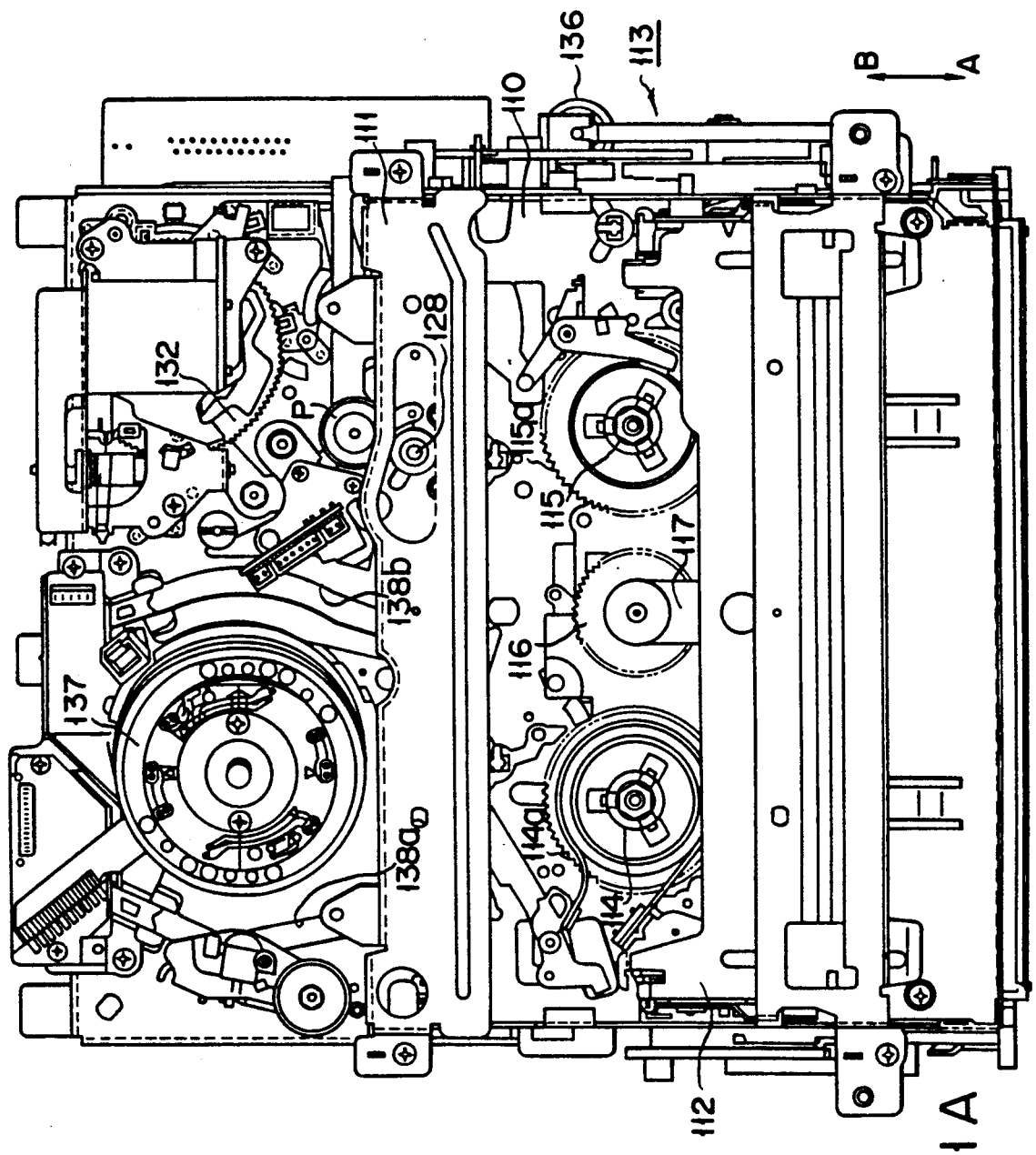

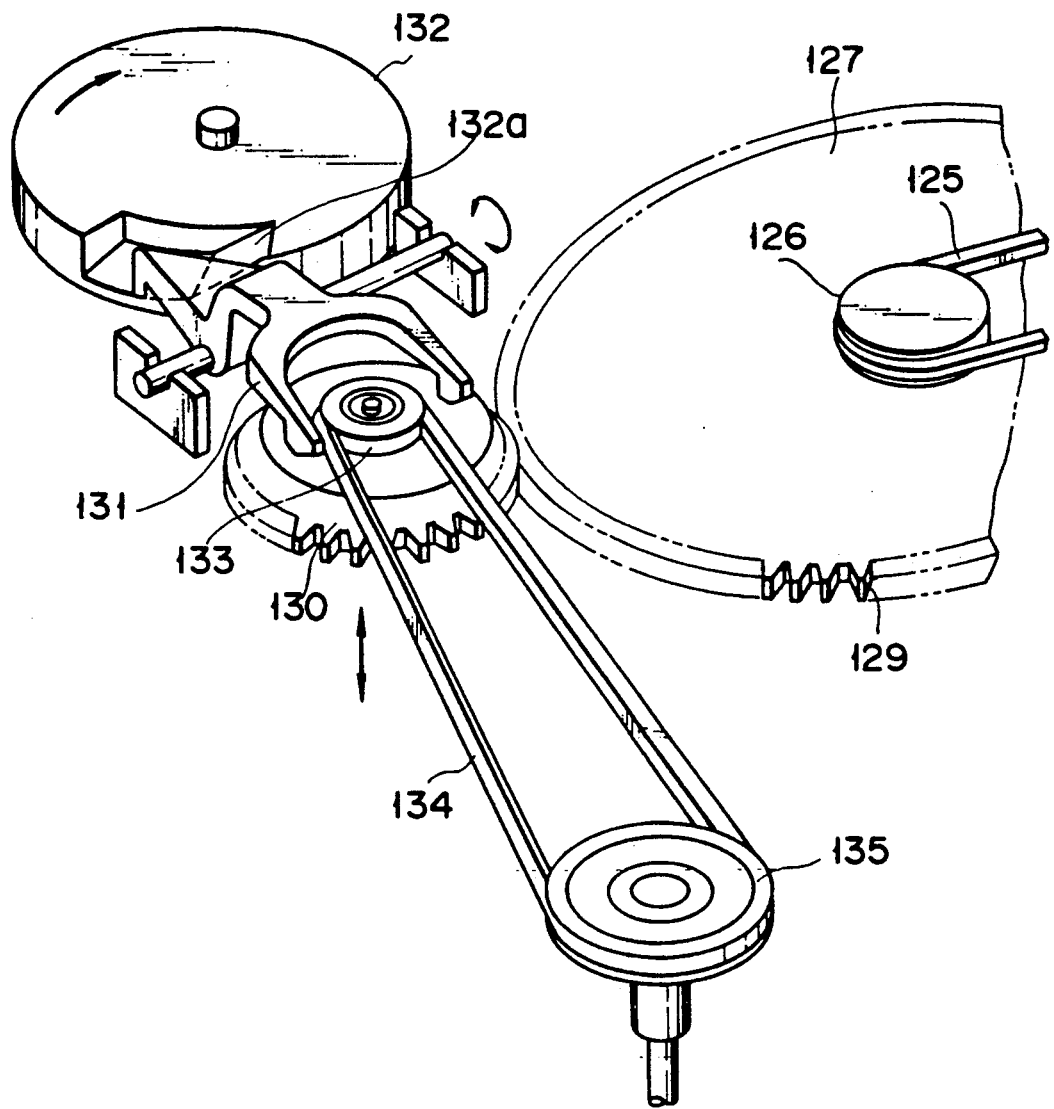
F I G. 3

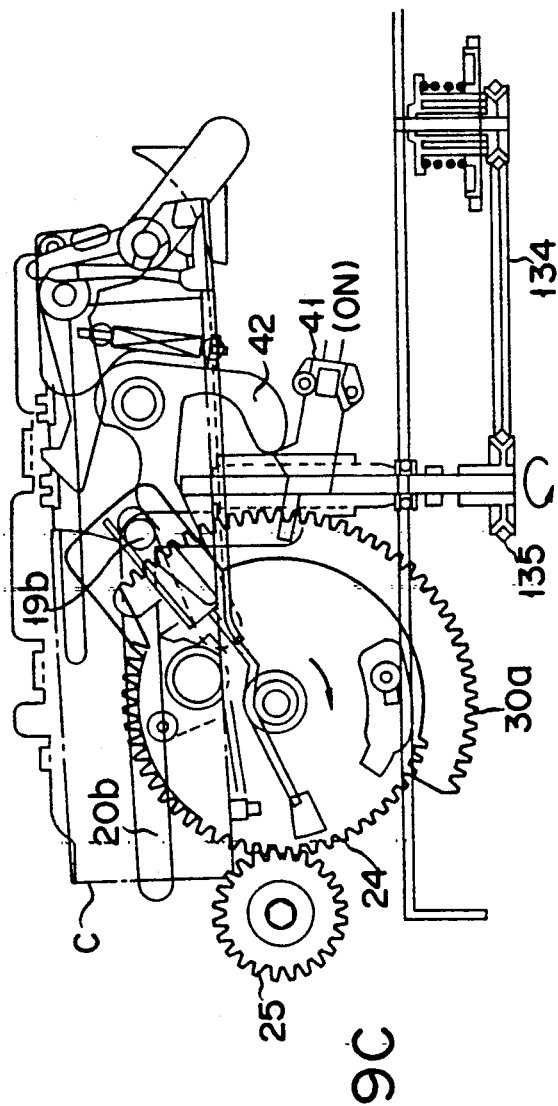
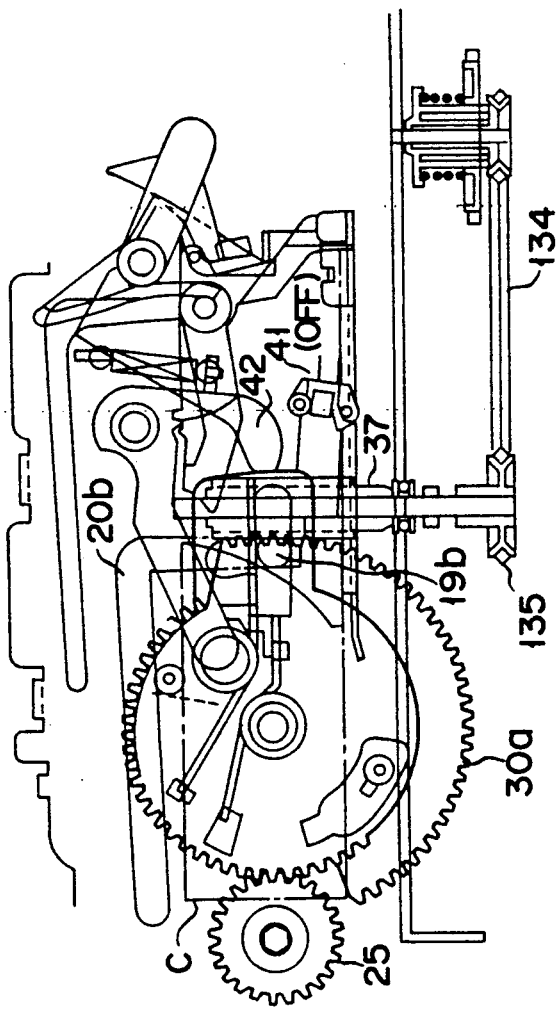

CASSETTE LOADING APPARATUS WITH SINGLE SWITCH CONTROL

BACKGROUND OF THE INVENTION

1. Field of the Invention

The present invention generally relates to a cassette loading apparatus and, more particularly, to a cassette loading apparatus, used for a magnetic recording/reproducing apparatus such as a video tape recorder (to be referred to as a VTR hereinafter), for driving a tape cassette in a substantially horizontal state and loading it to a tape driving portion.

2. Description of the Related Art

A cassette loading apparatus used for a recent VTR is generally designed such that when a tape cassette is inserted in the cassette holder in a substantially horizontal state, the front loading mechanism is operated to move the cassette holder to a position above the tape driving portion, and the tape cassette, which is lowered and held, is loaded to the tape driving portion. In this case, the cassette cover of the tape cassette is opened, and the tape extract members of the tape loading mechanism are moved inside the tape. In this state, the tape loading mechanism is driven to perform tape loading.

In ejection of the tape cassette, an unloading operation is performed to move the cassette out of the cassette holder by performing a reverse operation to the above-described loading operation.

FIG. 14 shows such a conventional cassette loading apparatus. A first switch 3 for detecting a cassette is arranged on a cassette holder 2 in which a tape cassette 1 is inserted. Upon insertion of the tape cassette 1 into the cassette holder 2, the first switch 3 detects this insertion and drives a front loading mechanism 4 so as to move the cassette holder 2 to a tape driving position indicated by a dotted line in FIG. 14. When the cassette holder 2 reaches the tape driving position, a second switch 5 for detecting cassette loading, which is arranged to correspond to the tape driving position, detects this and stops the front loading mechanism 4. At the same time, the second switch 5 drives/controls a tape loading mechanism (not shown) so as to perform tape loading. In contrast to this, when an ejecting operation is performed to eject the tape cassette 1 from the tape driving position, the front loading mechanism 4 is reversed to unload the cassette holder 2 from the tape driving position to an ejecting position where the cassette can be removed. In this case, the cassette holder 2 drives a third switch 6 for detecting ejection. With this operation, the front loading mechanism 4 is stopped, and the ejecting operation is completed.

In the above-described cassette loading apparatus, however, the first to third switches 3, 5, and 6 are used to drive and control the cassette holder 2. Therefore, the first to third switches 3, 5, and 6 are arranged at predetermined positions, and wiring between the switches must be performed. Assembly and mounting steps including this wiring operation become very cumbersome.

As described above, since the conventional cassette loading apparatus uses three detecting switches so as to drive and control the cassette holder, assembly and mounting steps including a wiring operation become very cumbersome. This leads to problems such as an increase in cost and degradation in reliability.

SUMMARY OF THE INVENTION

It is, therefore, an object of the present invention to provide a new and improved cassette loading apparatus with a single switch control in which the number of components, especially switches, is decreased, and simplest assembly and mounting steps can be realized, thereby realizing a low cost and improving reliability.

According to the present invention, there is provided a cassette loading apparatus comprising:

a cassette holder which houses a cassette to be loaded and is arranged to be movable in a substantially horizontal state;

loading means including a guide member for guiding the cassette holder so as to load the cassette in a first direction from a loading start position to a loading end position and to unload the cassette in a second direction opposite to the first direction from an unloading start position to an unloading end position, and a driving member for driving the guide member in the first and second directions;

transmitting means for transmitting a driving force from a driving source to the driving member;

switch means including a pair of contacts which are switched to ON and OFF states so as to selectively supply power to the driving source, and first and second actuators for switching the pair of contacts to ON and OFF states, the second actuator being engaged with the guide member at the loading end position assumed by the guide member so as to switch the pair of contacts to an OFF state; and a switching member including first and second engaging portions which can be freely engaged with the driving member and the first actuator of the switch means, engagement of the first engaging portion with the driving member being released at the loading start position assumed by the guiding member so as to cause the second engaging portion to be engaged with the first actuator of the switch means, thereby switching the pair of contacts to an ON state, and the first engaging portion being engaged with the driving member at the unloading end position assumed by the guide member so as to cause the second engaging portion to be disengaged from the first actuator, thereby switching the pair of contacts to an OFF state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1A to 1C are top, bottom, and side views, respectively, of a VTR to which a cassette loading apparatus according to an embodiment of the present invention is applied;

FIG. 3 is a perspective view showing a detailed arrangement of a mode switching mechanism and a belt transmission mechanism portion;

FIGS. 9A to 9D and FIGS. 10A and 10B are views showing an operation sequence of a cassette loading mechanism;

DETAILED DESCRIPTION OF THE PREFERRED EMBODIMENT

An embodiment of the present invention will be described in detail below with reference to the accompanying drawings.

Figure 1B:
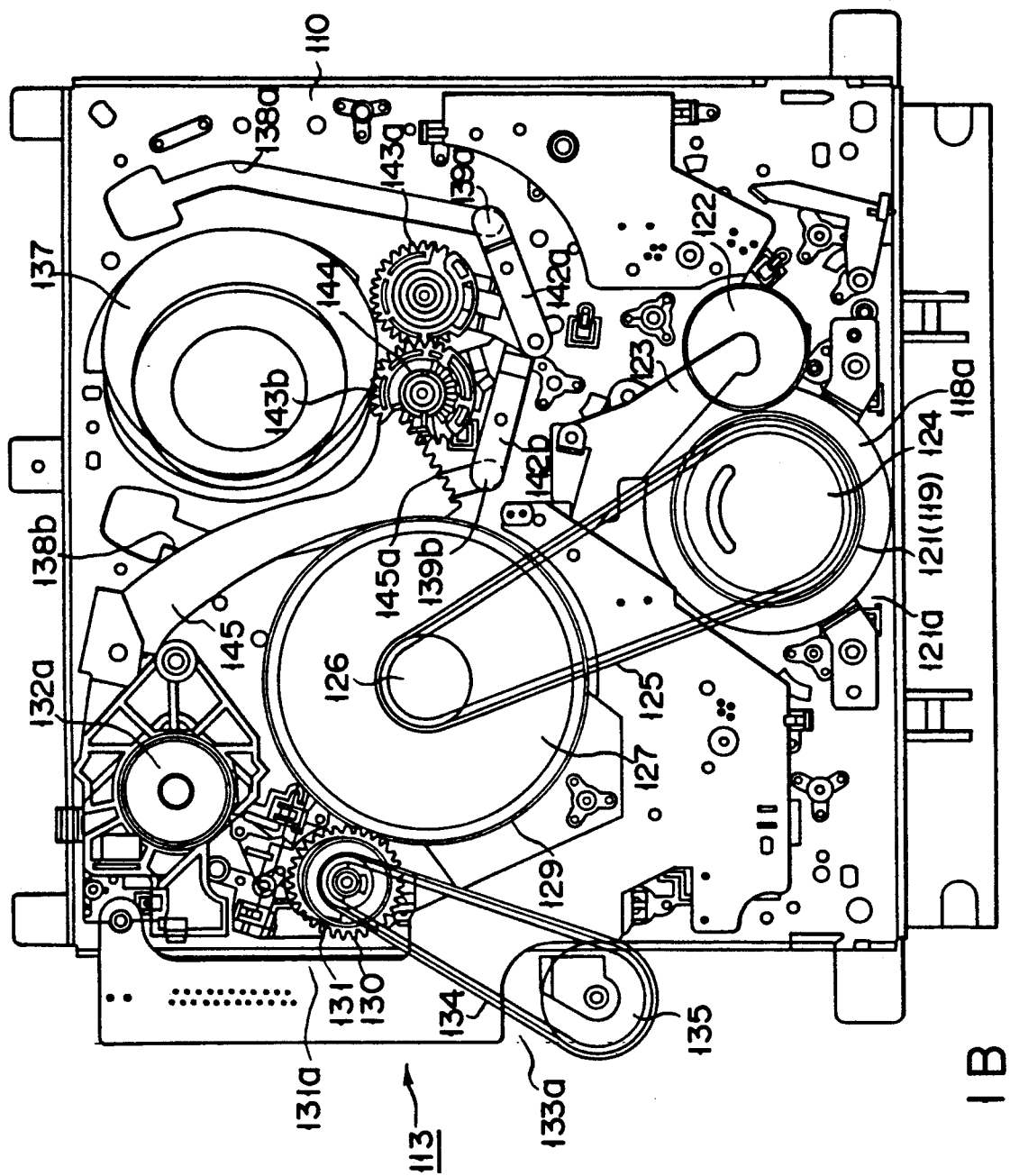
Figure 1C:
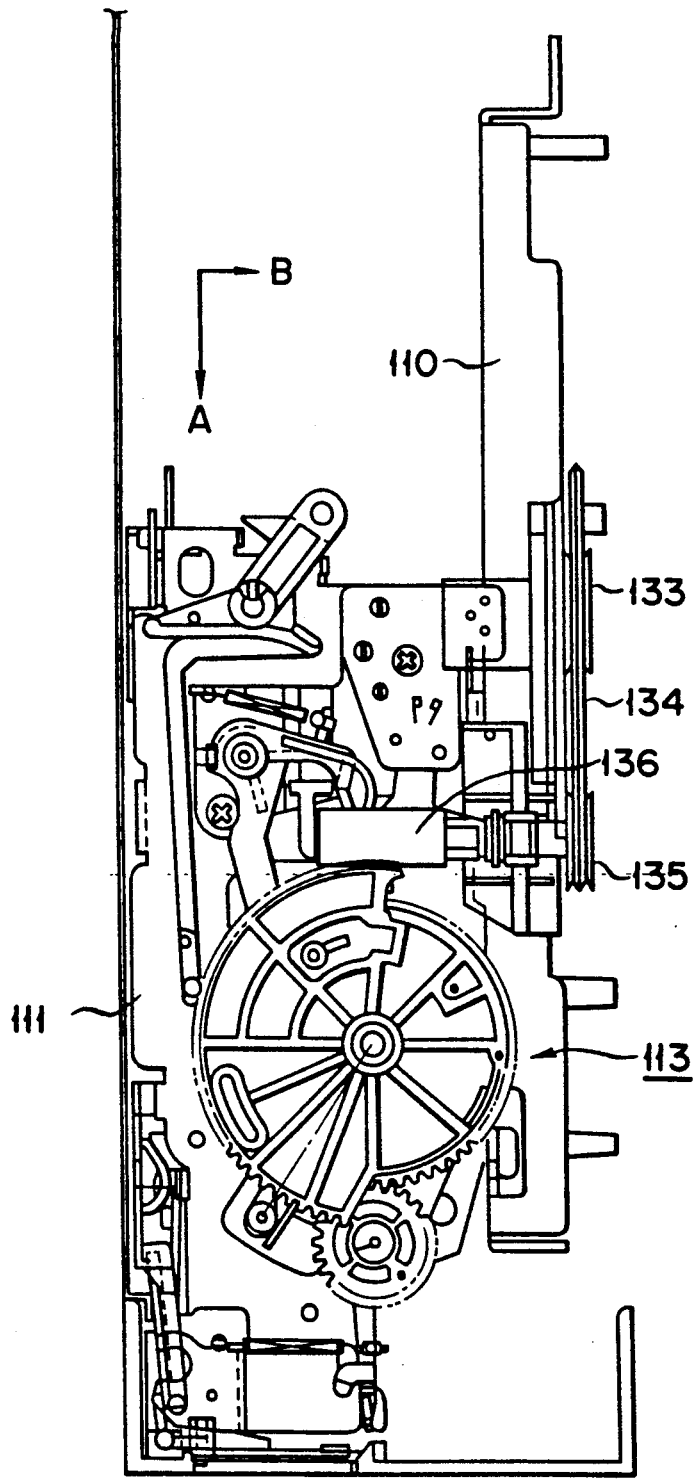

FIGS. 1A to 1C show a VTR to which an embodiment of the present invention is applied. FIGS. 1A, 1B, and 1C are respectively top, bottom, and side views of the VTR. Referring to FIGS. 1A to 1C, reference numeral 110 denotes a main chassis. A frame 111 is arranged at one end of the main chassis 110. A cassette holder 112 is supported on the frame 111 so as to be movable in directions indicated by arrows A and B. A tape cassette C (not shown in FIGS. 1A to 1C; see FIG. 4) is inserted in the cassette holder 112 when the holder 112 is set at a cassette insertion position which is the farthest position in the direction indicated by the arrow A. Upon this insertion operation, a front loading mechanism 113 as a cassette loading apparatus (to be described later) which constitutes a main feature of the present invention is driven and moved in the direction indicated by the arrow B so as to load the tape cassette C to reel hubs 114 and 15 on the tape feed side and tape take-up side of a tape driving portion.

Figure 2:
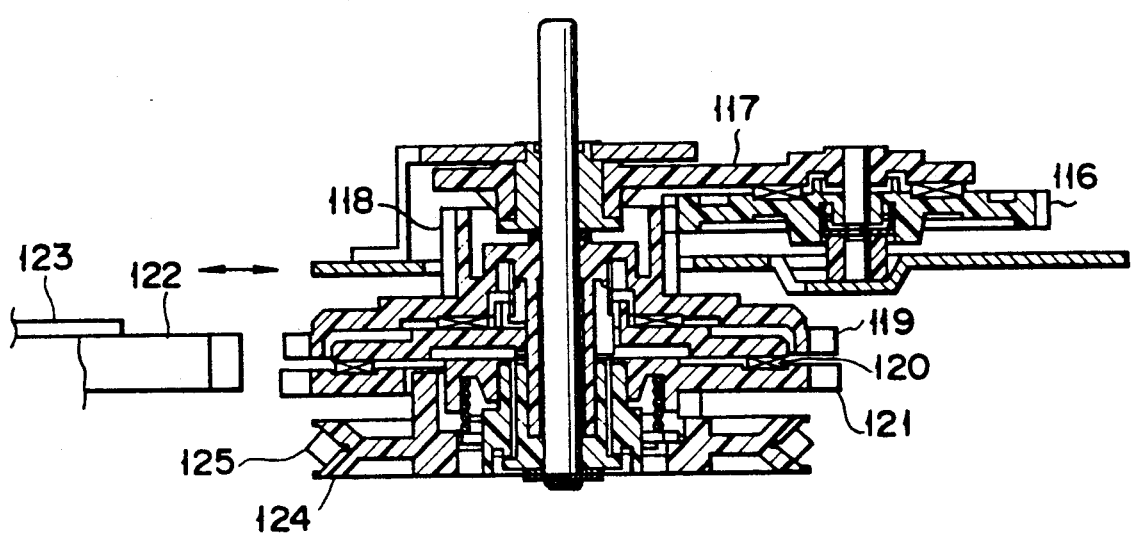
FIG. 2 is a sectional view showing of a clutch gear mechanism of FIG. 1B in detail.

Gears 114a and 115a are respectively arranged on the reel hubs 114 and 115, and a drive gear 116 constituting a tape driving mechanism is arranged between these gears 114a and 115a. The drive gear 116 is supported on one end of a swing member 117. As shown in FIG. 2, a gear 118 is attached to the other end of the swing member 117, and the gear 118 is meshed with the drive gear 116. The gear 118 is coaxially arranged with a first gear 119 of a clutch gear mechanism 118a. The first gear 119 is stacked on a second gear 121 through a friction member 120. A clutch switching gear 122 is opposed to the first and second gears 119 and 121 so as to be freely brought into contact therewith and separated therefrom. The gear 122 is pivotally mounted through a switching lever 123 which is interlocked with an operation mode switching mechanism, and is selectively meshed with the first and second gears 119 and 121, in response to the operation mode. A pulley 124 which constitutes a tape driving belt transmission mechanism 121a is coaxially arranged with the second gear 121. One end of a drive belt 125 is looped around the pulley 124, and the other end of the belt 125 is looped around a drive pulley 126 (see FIG. 1B). The drive pulley 126 is fitted on the rotating shaft of a driving capstan motor 127. A capstan 128 is coaxially mounted on the capstan motor 127. The driving force of the motor 127 is transmitted to the pulley 124 through the drive belt 125. As a result, the pulley 124 drives one of the gears 114a and 115a of the reel hubs 114 and 115 through the gear 122, the first gear 119, the gear 118, the swing member 117, and the drive gear 116. The tape is driven while being clamped between the capstan 128 and a pinch roller P.

A drive gear 129 is fitted around a rotating body of the capstan motor 127. A lifting gear 130 is opposed to the drive gear 129. The lifting gear 130 is arranged to be freely moved, through a spring mechanism (not shown), in the axial direction with respect to the main chassis 110. One end of a pivotal switching lever 131 is engaged with the upper surface of the lifting gear 130 (see FIG. 3). The other end of the switching lever 131 is engaged with a first cam portion formed on one surface of a mode switching cam 132 of an operation mode switching mechanism 131a. The pivotal movement of the switching lever 131 is controlled through the mode switching cam 132 in such a manner that one end of the switching lever 131 is separated from the lifting gear 130 in a cassette loading state so as to cause the lifting gear 130 to move upward through the spring mechanism (not shown) and to be meshed with the drive gear 129, and, in a state in which cassette loading is completed, one end of the switching lever 131 causes the lifting gear 130 to move downward against the biasing force of the spring mechanism (not shown) to be separated from the drive gear 129. In addition, a pulley 133 is coaxially arranged on the lifting gear 130. One end of a drive belt 134 which constitutes a cassette loading belt transmission mechanism 133a is looped around the pulley 133. The other end of the drive belt 134 is looped around a pulley 135. The pulley 135 is coaxially arranged with a worm 136 (see FIG. 1A) of the loading mechanism 113. The rotational force of the capstan motor 127 is selectively transmitted to the pulley 133, the drive belt 134, the pulley 135, and the worm 136 in accordance with the vertical movement of the lifting gear 130, thereby controlling the driving operation of the loading mechanism 113 and moving of the Cassette holder 112 in the above-described manner.

Figure 4:
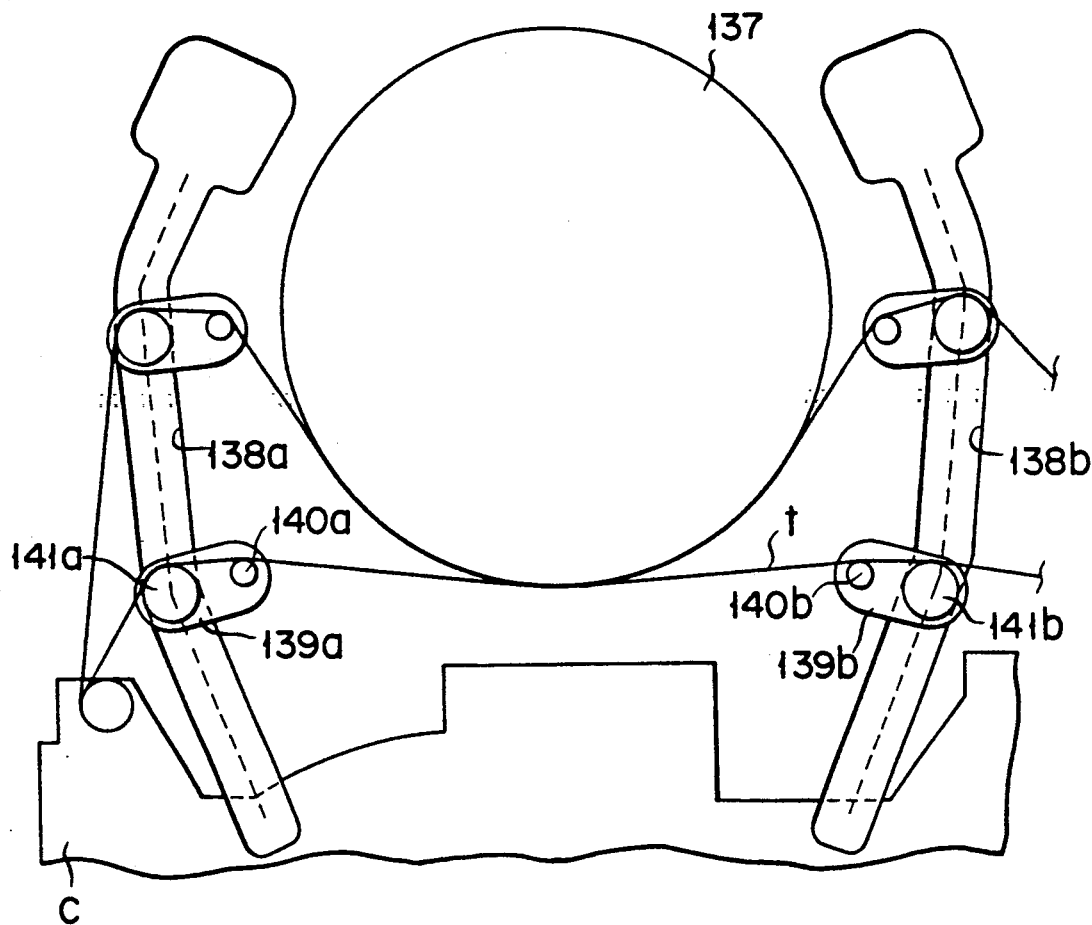
FIGS. 4 and 5 are perspective views respectively showing a tape loading state and a link mechanism, in detail, with respect to a cylinder shown in FIGS. 1A and 1B.
Figure 5:
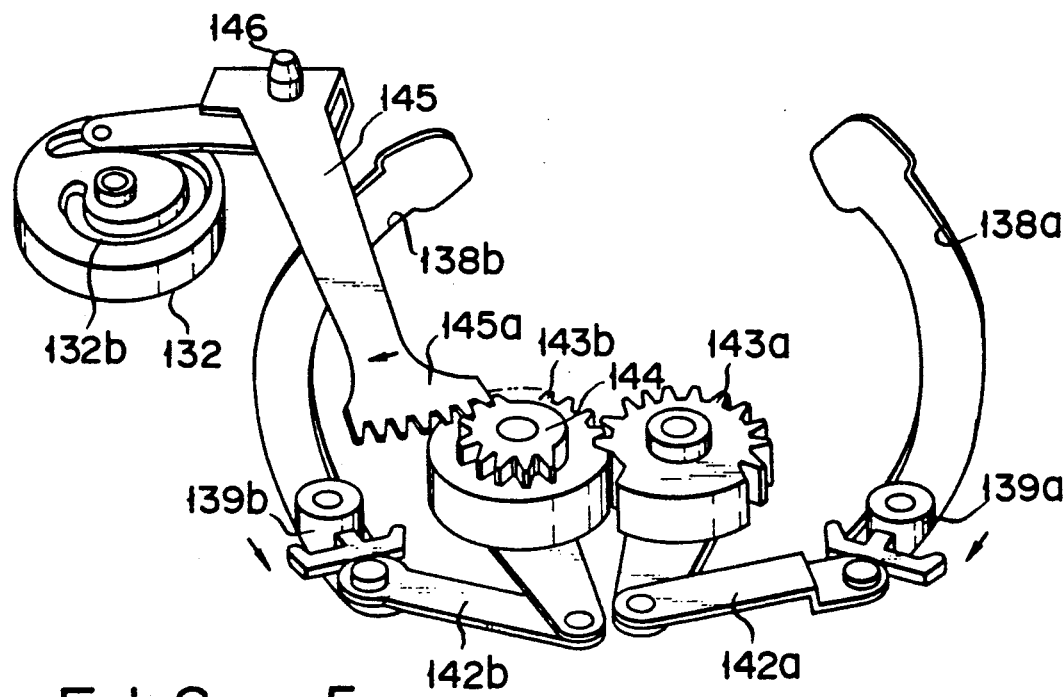

A helical scan type cylinder 137 on which magnetic heads are mounted is arranged on the main chassis 110 so as to correspond to the frame 111. First and second guide grooves 138a and 138b are formed around the cylinder 137 on the main chassis 110 so as to oppose the tape inlet and outlet sides, respectively. As shown in FIG. 4, first and second tape extract members 139a and 139b are movably housed in the first and second guide grooves 138a and 138b. Inclined posts 140a and 140b which are substantially parallel to the cylinder 137 and guide rollers 141a and 141b which are substantially perpendicular to the main chassis 110 are respectively mounted on the first and second tape extract members 139a and 139b so as to be abreast with each other. One end of each of first and second link mechanisms 142a and 142b is coupled to a corresponding base portion of the first and second tape extract members 139a and 139b, as shown in FIG. 5. The other end of each of first and second link mechanisms 142a and 142b is supported by a corresponding one of first and second drive gears 143a and 143b which are meshed with each other. A notched gear 144 is coaxially arranged on the second drive gear 143b. A fan-like gear 145a which is formed on one end of a drive lever 145 is meshed with the notched gear 144. The intermediate portion of the drive lever 145 is pivotally supported on the main chassis 110 through a pivot shaft 146, and the other end thereof is engaged with a second cam surface 132b of the mode switching cam 132. Therefore, the drive lever 145 is driven upon interlocking with the mode switching cam 132 so as to drive the first and second tape extract members 139a and 139b through the notched gear 144, the first and second drive gears 143a and 143b, and the first and second link mechanisms 142a and 142b, thereby performing tape loading.

A main part of a cassette loading apparatus of the present invention which is applied to the above-described VTR will be described below.

Figure 6:
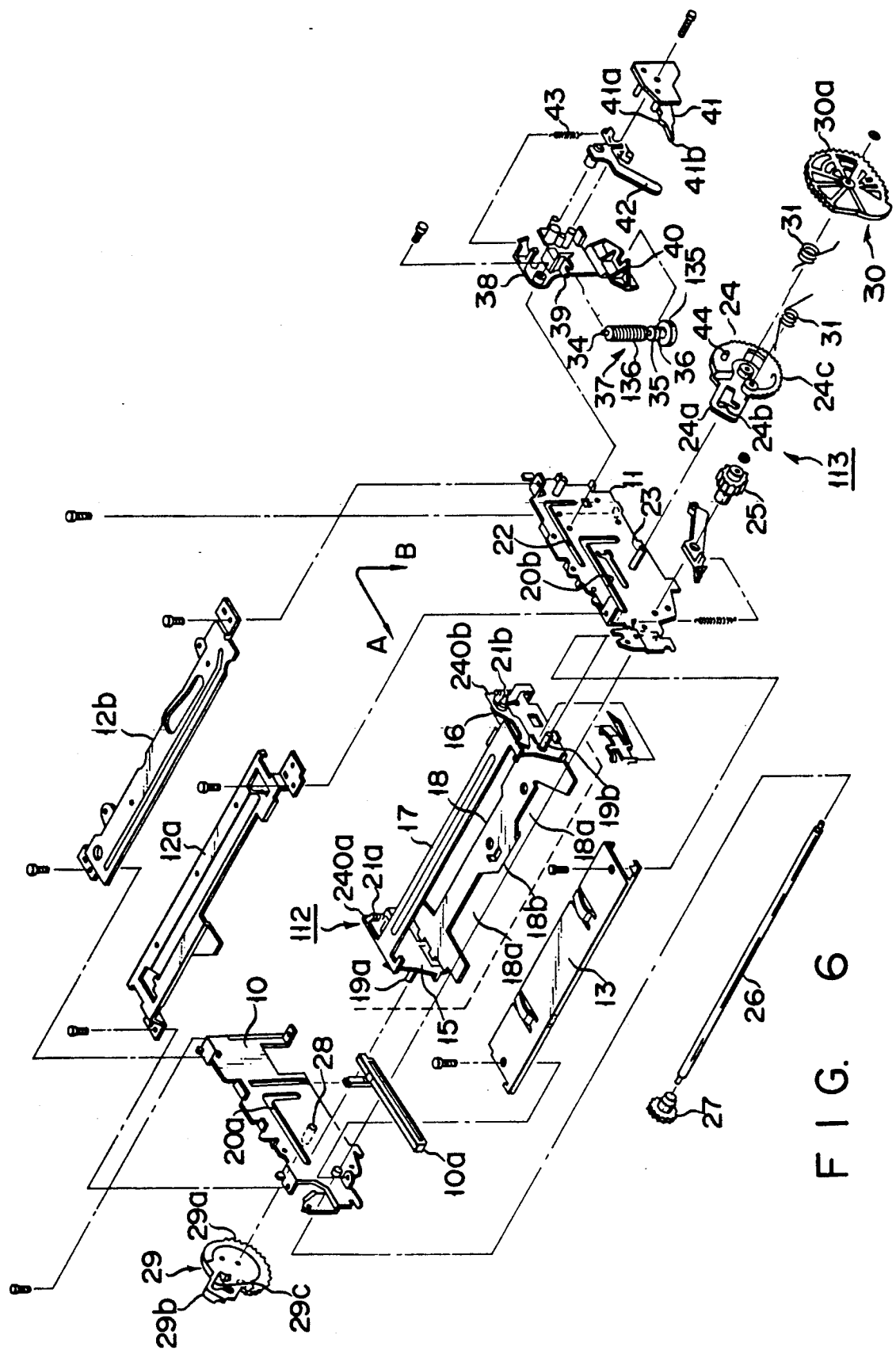
FIG. 6 is an exploded perspective view showing a main part of the present invention.

FIG. 6 is an exploded perspective view showing the cassette loading apparatus detached from the VTR shown in FIGS. 1A to 1C. Referring to FIG. 6, reference numerals 10 and 11 respectively denote first and second support plates constituting a support member. The first and second support plates 10 and 11 are assembled through upper coupling plates 12a and 12b and a lower coupling plate 13 serving also as a cassette guide in the form of a box. For example, an entrance cover (not shown) is pivotally arranged on the cassette loading/unloading side of the support member. The above-described cassette holder 112 is arranged between the first and second support plates 10 and 11 so as to be freely moved in directions indicated by arrows A and B in a substantially horizontal state.

Guides 10a (only one of them is shown) on which the cassette holder 112 is mounted are attached to the lower portions of the first and second support plates 10 and 11, respectively.

Figure 7:
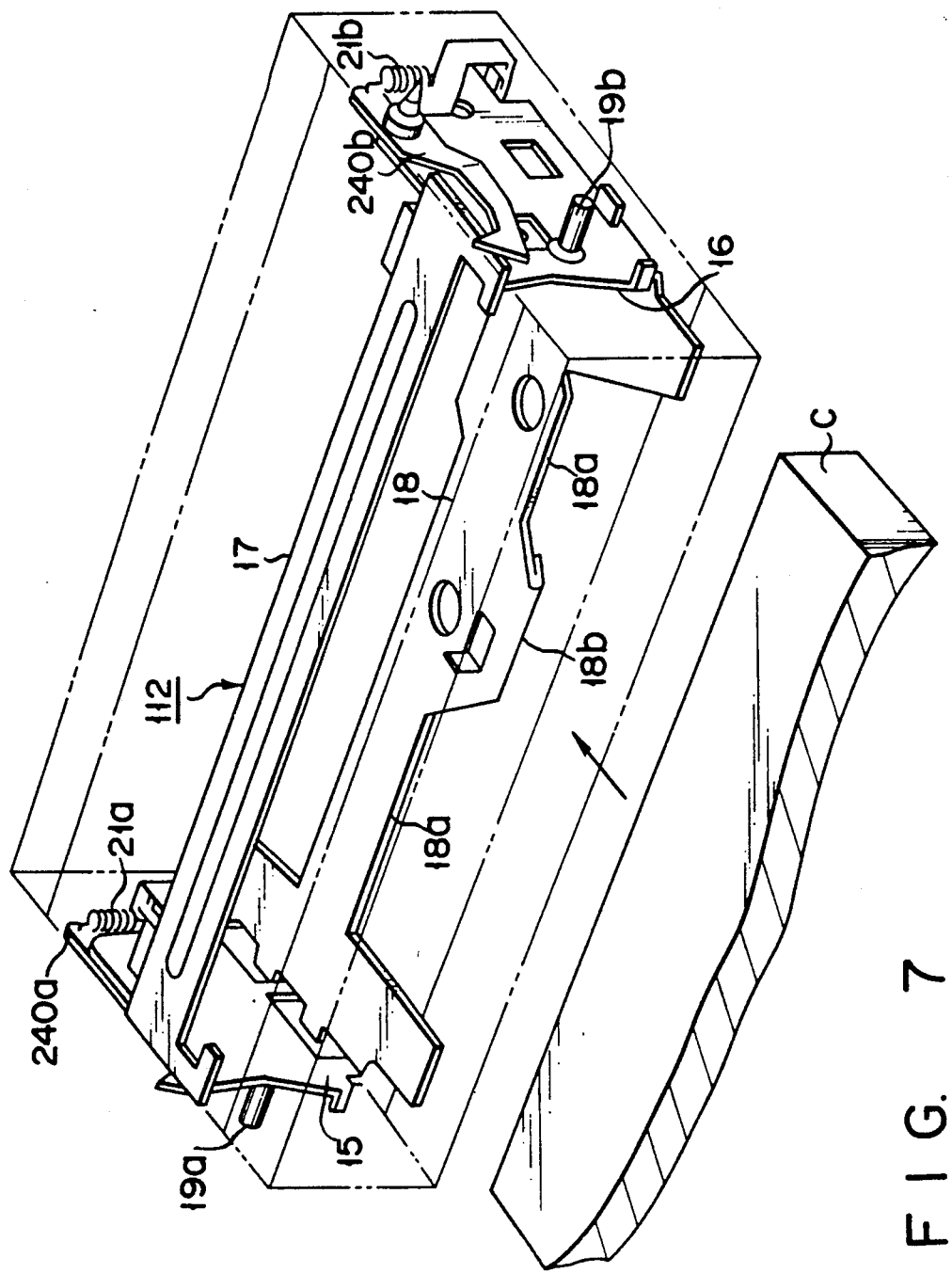
FIG. 7 is a perspective view showing an assembled state of a cassette holder in FIG. 6.

As shown in FIG. 7, the cassette holder 112 is designed such that first and second side plates 15 and 16 are assembled through upper and lower plates 17 and 18 in the form of a rectangle so as to form a cassette housing portion, and notches 18a are formed in the lower plate so as to correspond to the tape driving portion shown in FIGS. 1A to 1C.

Guide pins 19a and 19b are substantially axially arranged on the outer sides of the first and second side plates 15 and 16 of the cassette holder 112, respectively. These guide pins 19a and 19b are respectively inserted in substantially L-shaped guide holes 20a and 20b formed in the first and second support plates 10 and 11 so as to be freely guided. An engaging pin 21 is formed on the second side plate 16 so as to be substantially parallel to the guide pin 19b. The engaging pin 21 is inserted in a substantially L-shaped guide hole 22 formed in the second support plate 11 so as to be freely guided. With this arrangement, while the cassette holder 112 is clamped between the first and second support plates 10 and 11, it is slid on the guide 10a and moved, by the front loading mechanism 113 (to be described later), from the cassette insertion position in a substantially horizontal state (a direction indicated by an arrow B). The cassette holder 112 is then lowered in the vertical direction above the tape driving portion (see FIGS. 1A to 1C) so as to be guided to the cassette loading position, and is moved from the cassette loading position in the reverse direction (a direction indicated by an arrow A) to the cassette unloading position where the cassette can be removed.

A shaft 23 extends from the outer side of the second support plate 11. A first loading gear 24 constituting the front loading mechanism 113 is pivotally supported on the shaft 23. An arm portion 24a is formed on the first loading gear 24. An engaging hole 24b is formed in the arm portion 24a. The guide pin 19b of the second side plate 16 of the cassette holder 112 is inserted in the engaging hole 26b. A gear portion 24c is formed around the first loading gear 24. A transmission gear 25 is meshed with the gear portion 24c. The transmission gear 25 is fitted on one end of a shaft 26 rotatably arranged between the first and second support plates 10 and 11. A transmission gear 27 is fitted on the other end of the shaft 26. With this arrangement, upon rotation, the first loading gear 24 rotates the transmission gear 27 through the transmission gear 25 and the shaft 26.

A shaft 28 extends from the first support plate 10. A second loading gear 29 is rotatably supported on the shaft 28. A gear portion 29a is formed on the second loading gear 29. The transmission gear 27 is meshed with the gear portion 31a. In addition, an arm portion 29b is formed on the second loading gear 29. An engaging hole 29c is formed in the arm portion 29b. The guide pin 19a of the first side plate 15 of the cassette holder 112 is inserted in the engaging hole 29c. With this arrangement, these first and second loading gears 24 and 29 are synchronously rotated through the transmission gear 25, the shaft 26, and the transmission gear 27. Upon this rotation, the cassette holder 112 is driven through the guide pins 19a and 19b.

Figure 8:
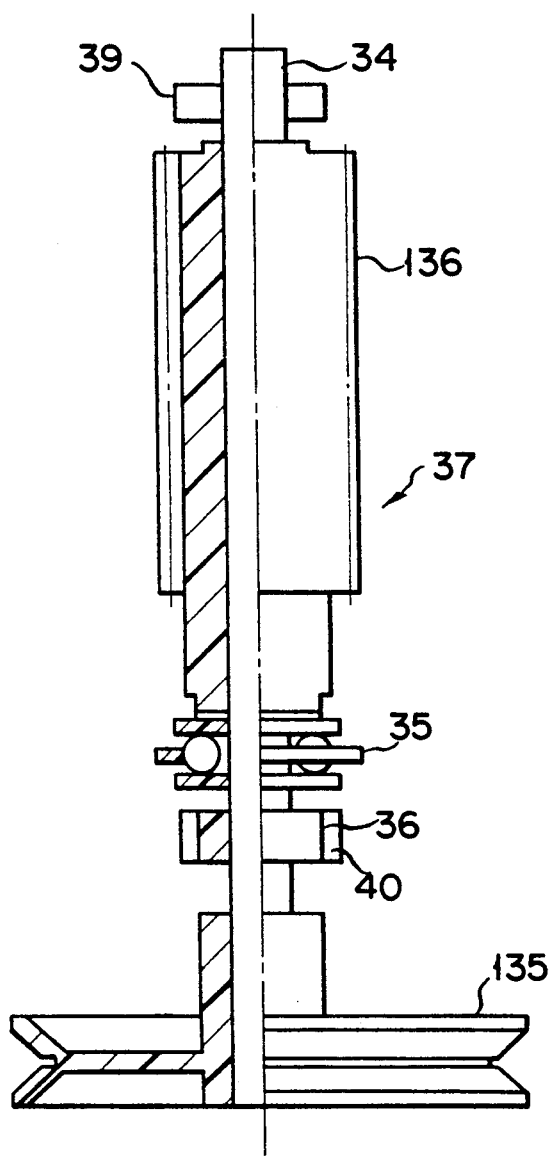
FIG. 8 is a sectional view showing a worm unit in FIG. 6 in detail.

A third loading gear 30 is arranged on the shaft 23 of the second support plate 11 in a stacked state with respect to the first loading gear 24. These first and third loading gears 24 and 30 are elastically engaged with each other through a spring 31. A gear portion 30a is formed around the third loading gear 30 so as to correspond to the gear portion 24c of the first loading gear 24. The worm 136 is meshed with the gear portion 30a. As shown in FIG. 8, the pulley 135 having a belt transmission mechanism formed on its one end is coaxially fitted on the worm 136 through a shaft 34. A worm unit 37, generally called a retainer assembly, which is assembled by integrally supporting a thrust bearing 35 and a radial bearing 36 is formed at the intermediate portion of the shaft 34. The worm unit 37 is mounted on a mounting member 38 mounted on the second support plate 11. First and second elastic support portions 39 and 40 are formed on the mounting member 38 so as to correspond to the other end of the shaft 34 and the radial bearing 36, respectively. The other end of the shaft 34 of the worm 136 and the radial bearing 36 of the worm unit 37 are respectively attached to the first and second elastic support portions 39 and 40 against their elastic forces. As described above, the rotational force of the capstan motor 127 is selectively transmitted to the pulley 135 through the transmission belt 134, and is then transmitted to the first and second loading gears 24 and 29 through the third loading gear 30.

Figure 9A:
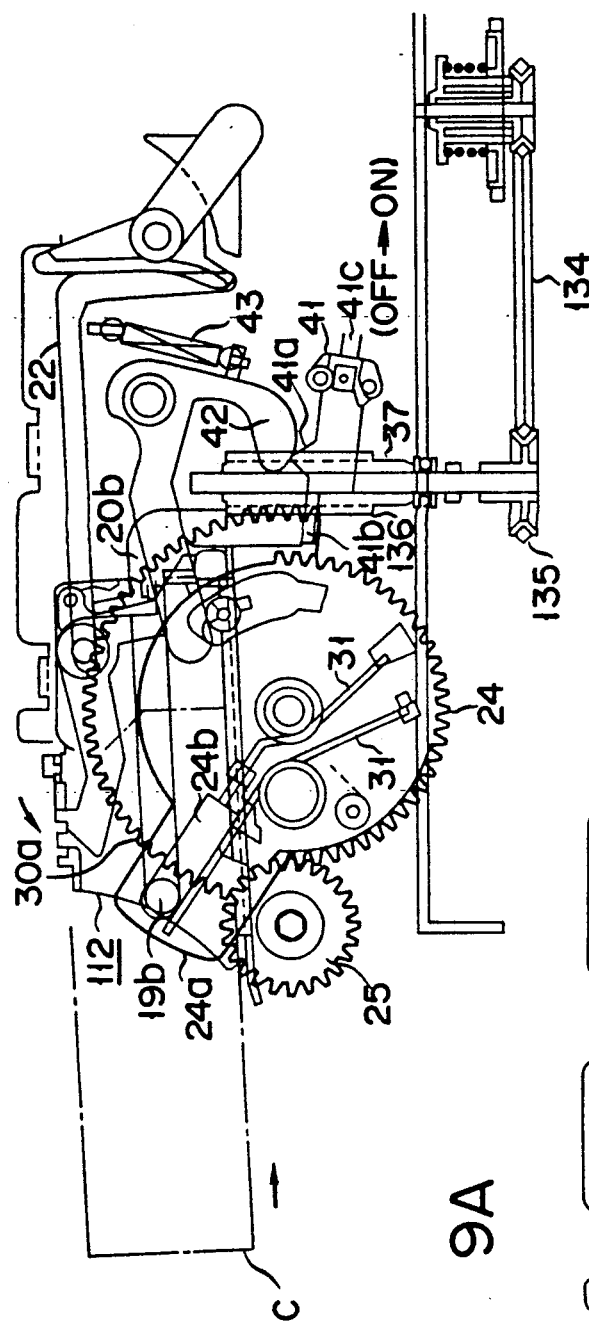
Figure 9B:
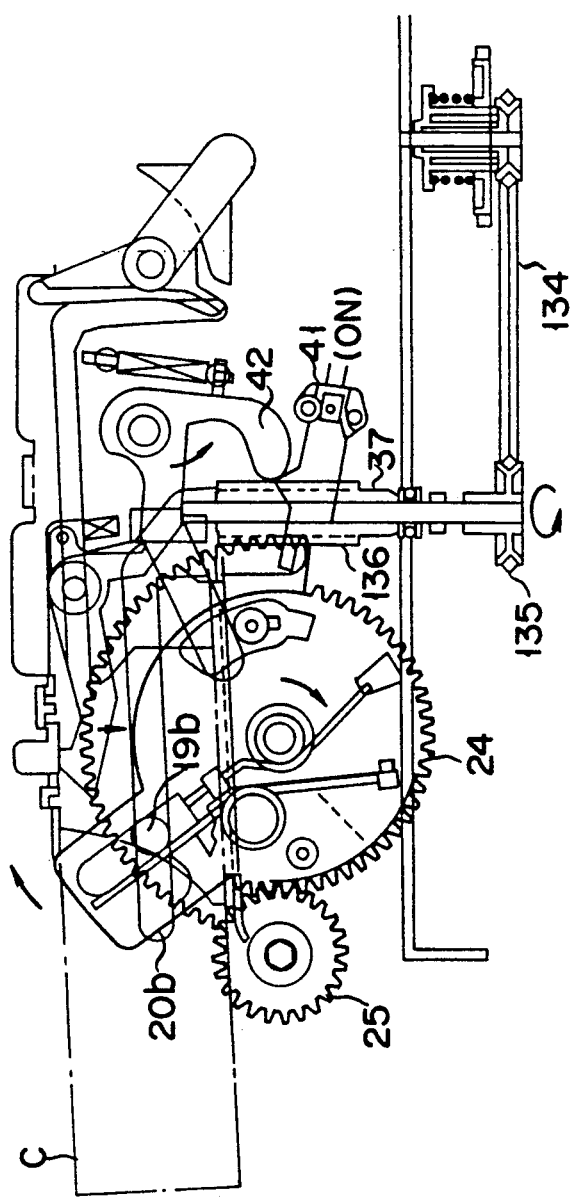
Figure 10A:
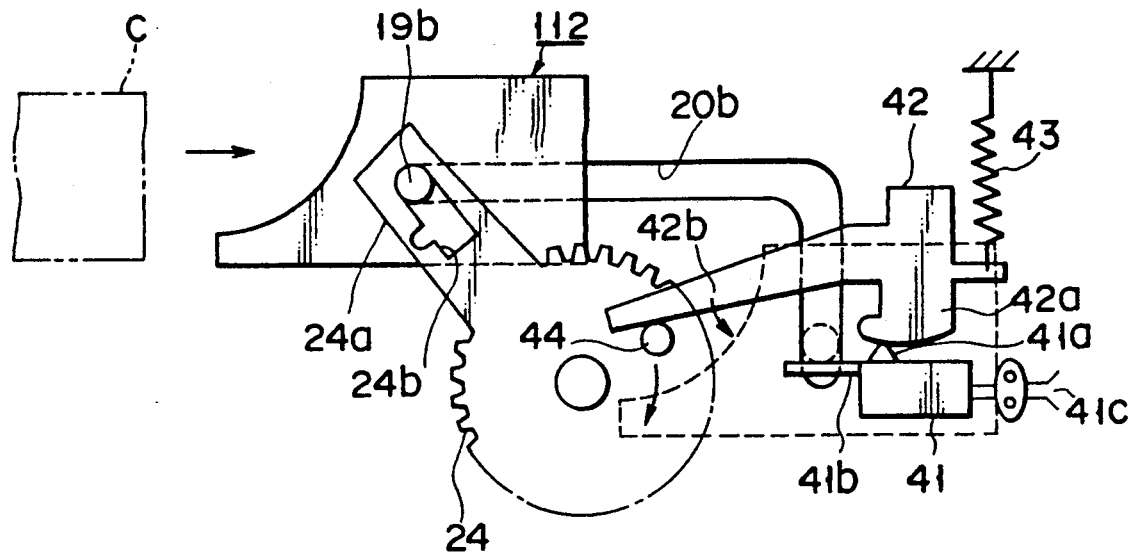
Figure 10B:
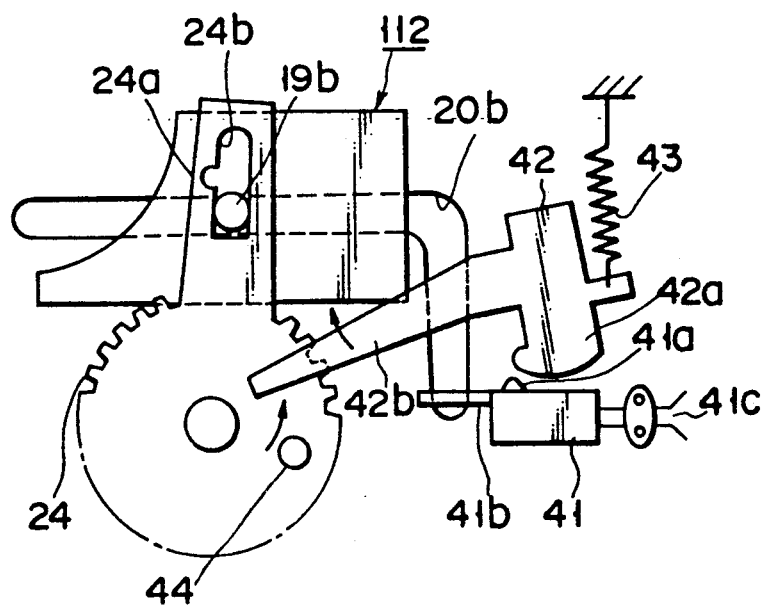
Figure 11:
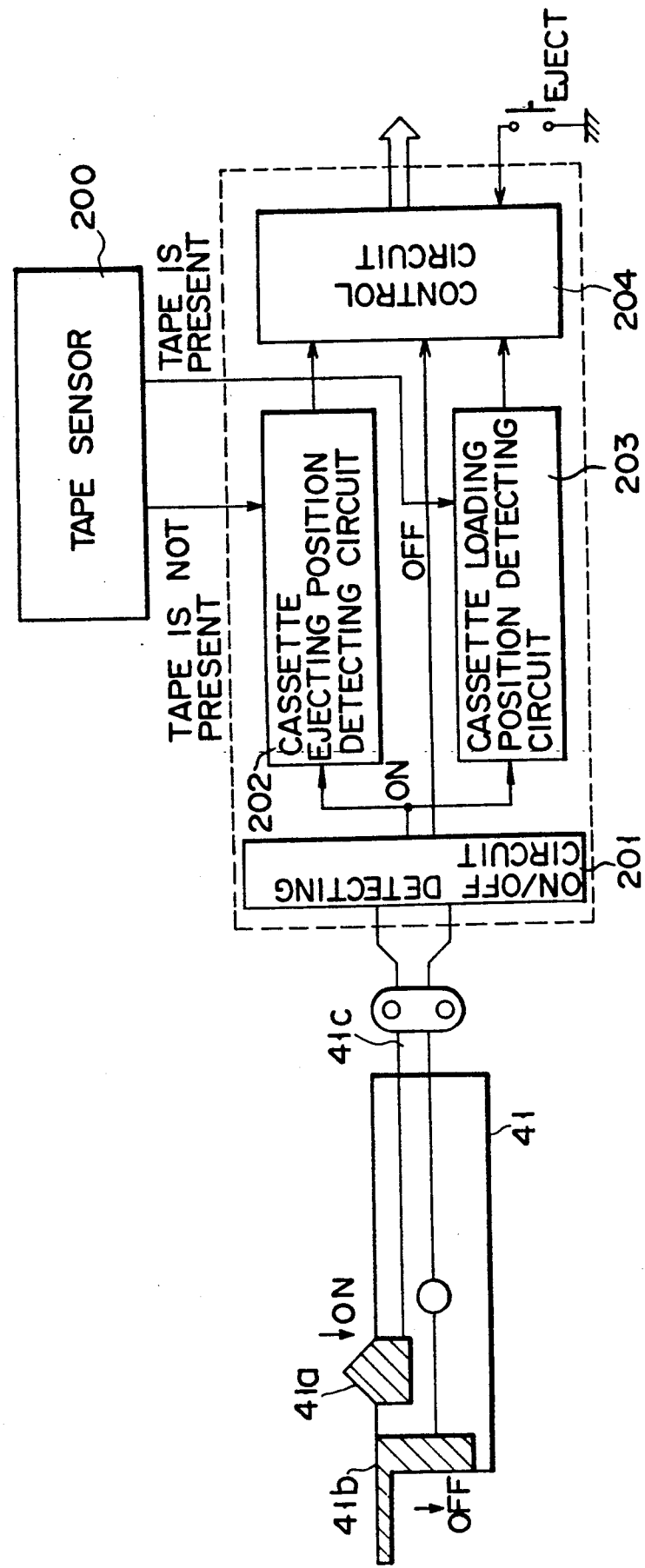
FIG. 11 is a block diagram showing a cassette position detecting circuit using a two-contact type switch.

In order to detect the position of a cassette, a switch 41 including a pair of contacts 41c and first and second drive portions 41a and 41b for switching the ON/OFF states of the contacts 41c, and a switch operating member 42 are arranged on the mounting member 38 so as to correspond to each other (see FIGS. 10A and 10B). The switch operating member 42 has first and second engaging portions 42a and 42b, and is arranged such that a biasing force acts on the member 42 in the counter clockwise direction in FIGS. 10A and 10B through a spring 43. The first engaging portion 42a is opposed to the first drive portion 41a of the switch 41. A drive portion 44 formed on the first loading gear 24 is opposed to the second engaging portion 42b of the switch operating member 42. With this arrangement, when the engagement of the first loading gear 24 with the drive portion 44 is released at the cassette insertion position controlled by the cassette holder 112, the second engaging portion 42a is engaged with the first drive portion 41a of the switch 41 so as to set the pair of contacts 41c in an ON state, thus performing switching control. In addition, the second drive portion 41b of the switch 41 is arranged to correspond to the base portion of the guide hole 20b of the second support plate 11 so that when the cassette holder 112 reaches the tape driving portion, it is engaged with the guide pin 19b of the second side plate 16 so as to set the pair of contacts 41c in an OFF state, thus performing switching control. As shown in FIG. 9A, therefore, when the tape cassette C is inserted in the cassette holder 112, the holder 112 moves in the cassette insertion direction, while the first loading gear 24 is pivoted clockwise and the switch operating member 42 is pivoted counterclockwise. As a result, the second engaging portion 42b of the switch operating member 42 is disengaged from the drive portion 44, and the first drive portion 41a of the switch 41 is engaged with the first engaging portion 42b of the switch operating member 42, thus switching the pair of contacts 41c to an ON state, as shown in FIG. 10A. Subsequently, as shown in FIG. 9B, a driving force from the capstan motor 127 as a drive source is transmitted to the worm 136 and the third loading gear 30 through the transmission belt 134. As a result, the driving force is transmitted to the first and second loading gears 24 and 29 in the above-described manner, so as to load the cassette holder 112 (see FIG. 9C). When the cassette holder 112 reaches the tape driving portion as shown in FIG. 9D, the second drive portion 41b of the switch 41 is switched by the guide pin 19b of the cassette holder 112, and hence the pair of contacts 41c are turned off, as indicated by a dotted line in FIG. 10A. At this time, transmission of the driving force of the capstan motor 127 is stopped. When an ejecting operation is performed, and the capstan motor 127 is driven in the reverse direction, the worm 136, the third loading gear 30, and the first and second loading gears 24 and 29 are driven in the reverse direction. As a result, the cassette holder 112 is unloaded and moved to the cassette ejecting position where a user can remove the tape cassette. In this case, the switch operating member 42 is pivoted/biased clockwise by the drive portion 44 of the first loading gear 24 against the biasing force of the spring 43 as shown in FIG. 10B, and the first drive portion 41a of the switch 41 is finally disengaged from the first engaging portion 42b of the switch operating member 42 so as to switch the pair of contacts 42c to an OFF state, as shown in FIG. 10A. At this time, transmission of the driving force from the capstan motor 127 is stopped.

In this case, if a pair of contacts 41c of a two-contact type are used as the switch 41, discrimination of the cassette loading and ejecting positions controlled by the cassette holder 112 is performed in such a manner that the cassette loading position is detected in a state wherein a tape is detected by a tape sensor 200, and the cassette ejecting position is detected in a state wherein the tape is not detected by the tape sensor 200. More specifically, the ON/OFF state of the two-contact type contacts 41c of the switch 41 is detected by an ON/OFF detecting circuit 201. When an ON state is detected, the ON detection signal is compared with a tape absence or present signal from the tape sensor 200 in a cassette ejecting position detecting circuit 202 or a cassette loading position detecting circuit 203, and the comparison result is output to a control circuit 204.

In addition, cassette detecting members 240a and 240b for error protection are pivotally arranged on the first and second side plates 15 and 16 of the cassette holder 112 (see FIG. 7). Clockwise biasing forces are respectively exerted on the cassette detecting members 240a and 240b through the springs 21a. With this arrangement, for example, if the cassette C is removed during loading, the cassette detecting members 240a and 240b are pivoted through the springs 21a so as to selectively lock the lock portions 42a and 42b formed on the first and second support plates 10 and 11. As a result, the loading operation of the cassette holder 112 is reversed and the cassette holder 112 is moved to the original cassette insertion position.

As described above, the cassette loading apparatus is designed such that the cassette insertion position and the cassette ejecting position assumed by the cassette holder 112 are detected by controlling the operation of the switch 41 by means of the switch operating member 42 which is interlocked with the first loading cam 24, and the cassette loading position is detected by directly switching/controlling the guide pin 19b of the cassette holder 112. According to this arrangement, since detection of the position of the cassette holder 112 accompanying a loading operation can be performed by the single switch 41, assembly and mounting steps including wiring of the switch can be simplified as compared with the conventional apparatus which uses the three switches 3, 5, and 6. In addition, according to this arrangement, a compact, lightweight apparatus can be realized by decreasing the number of components, which also leads to low cost and high reliability.

Figure 12:
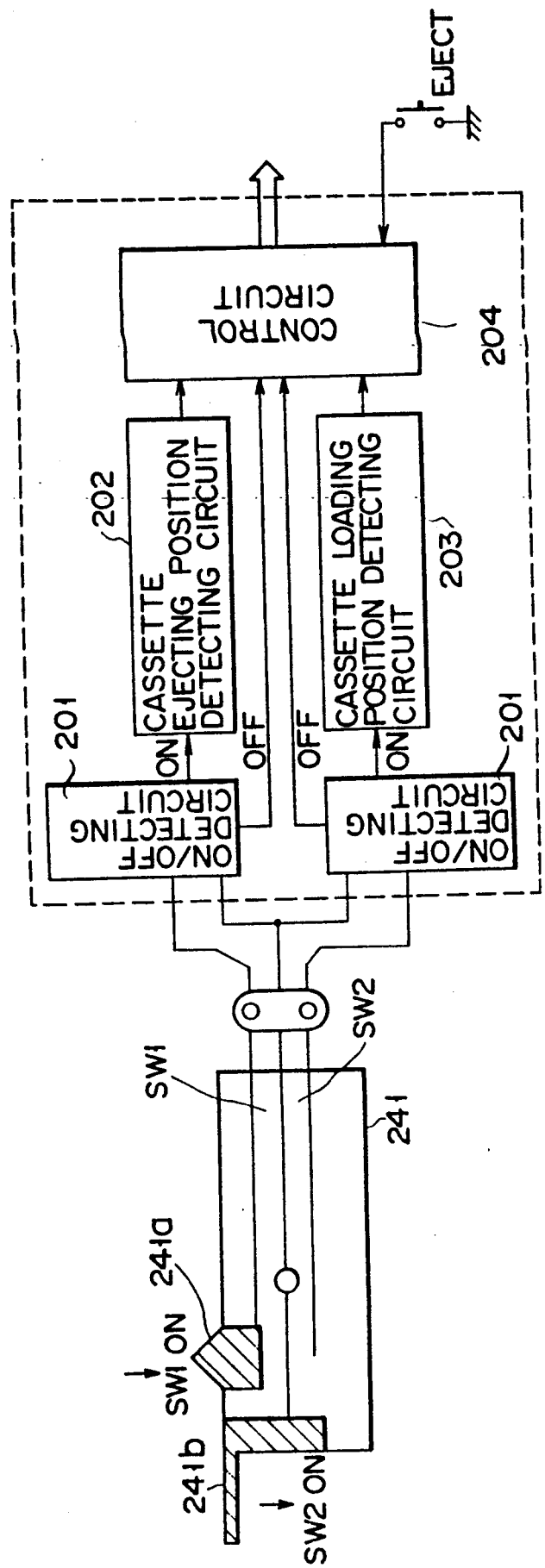
FIG. 12 is a block diagram showing a cassette position detecting circuit using a three-contact type switch.
Figure 13:
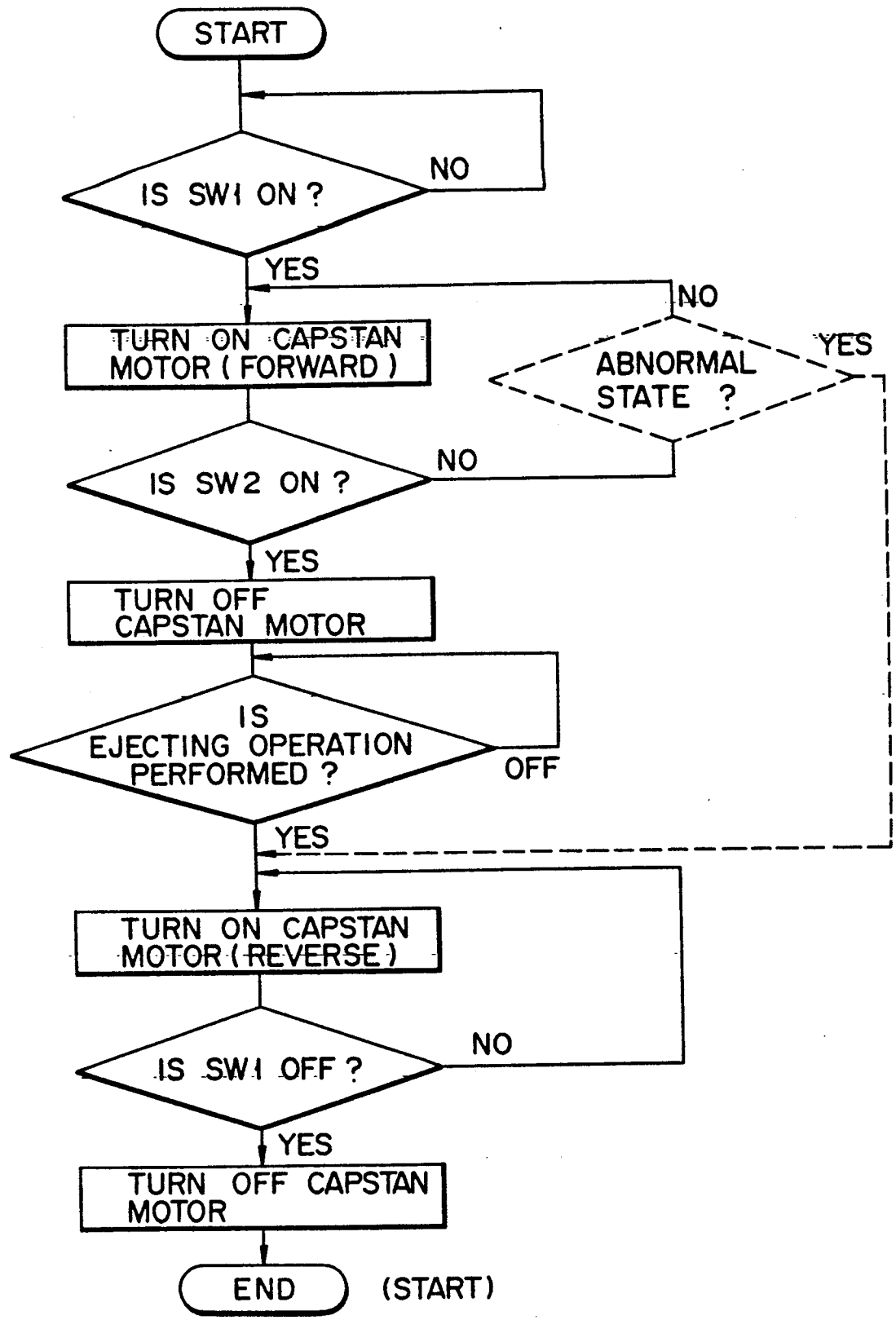
FIG. 13 is a flow chart for explaining an operation of the circuit in FIG. 12.
Figure 14:
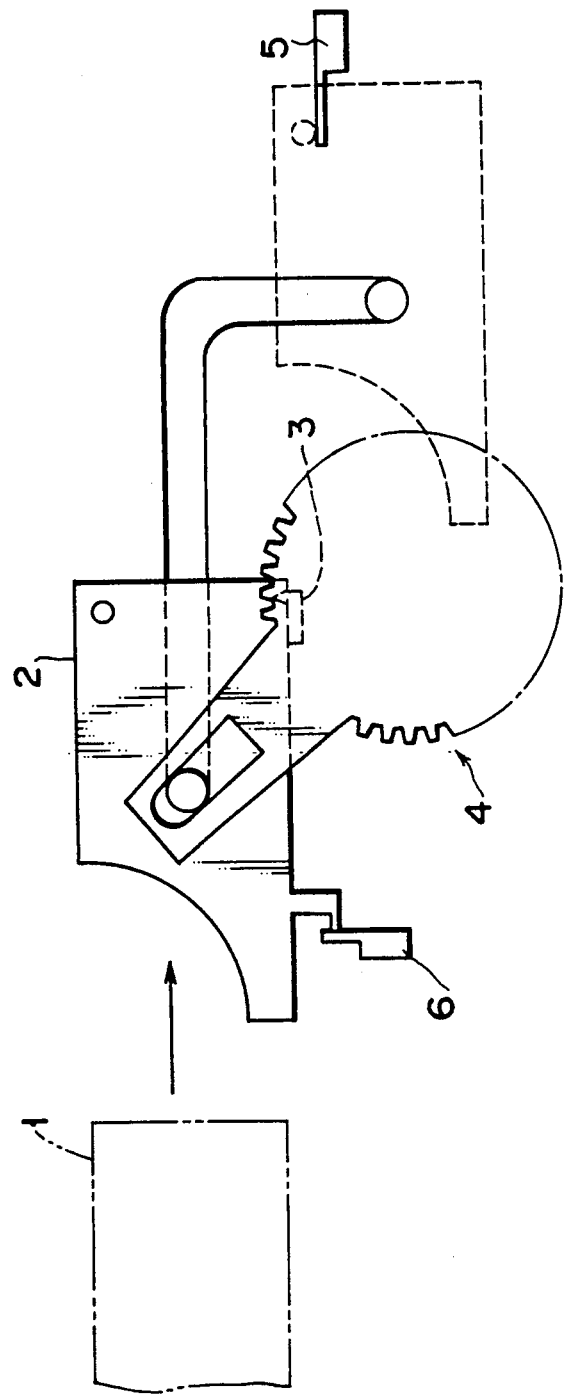
FIG. 14 is a view showing a main part of a conventional cassette loading apparatus.

Furthermore, in the above embodiment, a two-contact type switch is used. However, the present invention is not limited to this. For example, a switch 241 shown in FIG. 12 having two three-contact type switches SW1 and SW may be used. In this case, the position controlled by the cassette holder 121 can be directly discriminated from the switching state of the switch 241 without discriminating the switching state of the switch 241 by using the above-described tape end detector. FIG. 13 is a flow chart showing an operation of this case.

The present invention is not limited to the above-described embodiment. Various changes and modifications can be made within the spring and scope of the invention.

As has been described above in detail, according to the present invention, since a simple arrangement is realized to decrease the number of components and to realize simplest assembly and mounting steps, a low-cost, highly reliable cassette loading apparatus can be provided.

What is claimed is:
1. A cassette loading apparatus comprising:
a cassette holder which houses a cassette to be loaded and is arranged to be movable in a substantially horizontal state;
loading means including a guide member for guiding said cassette holder so as to load the cassette in a first direction from a loading start position to a loading end position and to unload the cassette in a second direction opposite to the first direction from an unloading start position to an unloading end position, and a driving member for driving said guide member in the first and second directions;

transmitting means for transmitting a driving force from a driving source to said driving member;

switch means including a pair of contacts which are switched to ON and OFF states so as to selectively supply power to said driving source, and first and second actuators for switching said pair of contacts to ON and OFF states, said second actuator being engaged with said guide member at the loading end position assumed by said guide member so as to switch said pair of contacts to an OFF state; and a switching member including first and second engaging portions which can be freely engaged with said driving member and said first actuator of said switch means, engagement of said first engaging portion with said driving member being released at the loading start position assumed by said guiding member so as to cause said second engaging portion to be engaged with said first actuator of said switch means, thereby switching said pair of contacts to an ON state, and said first engaging portion being engaged with said driving member at the unloading end position assumed by said guide member so as to cause said second engaging portion to be disengaged from said first actuator, thereby switching said pair of contacts to an OFF state.

2. An apparatus according to claim 1, wherein said switch means comprises a pair of two-contact type contacts.

3. An apparatus according to claim 2, wherein said apparatus further comprises cassette position detecting means for detecting a cassette position in accordance with output signals from said pair of two-contact type contacts and a tape sensor.

4. An apparatus according to claim 3, wherein said cassette position detecting means allows detection of a cassette unloading position when the output signal from said tape sensor represents the absence of a tape, and allows detection of a cassette loading position when the output signal from said tape sensor represents the presence of a tape.

5. An apparatus according to claim 1, wherein said switch means comprises a set of contacts including three-contact type of first and second circuits, said first and second circuits being respectively switched by said first and second actuators.

6. An apparatus according to claim 5, wherein said apparatus further comprises cassette position detecting means for directly detecting a cassette position in accordance with output signals from said three-contact type of first and second circuits.

7. An apparatus according to claim 6, wherein said cassette position detecting means allows detection of a cassette unloading position in accordance with the output signal from said first circuit which is switched by said first actuator, and allows detection of a cassette loading position in accordance with the output from said second circuit which is switched by said second actuator.

* * * * *